(No Model.)
C. MOEGLING.
MANUFACTURE OF SHELL JEWELRY.
No. 369,649. Patented Sept. 6, 1887.
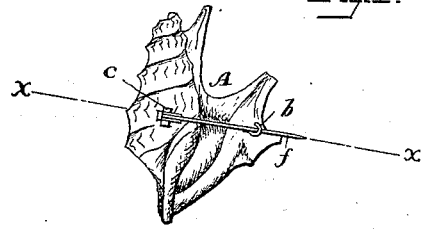
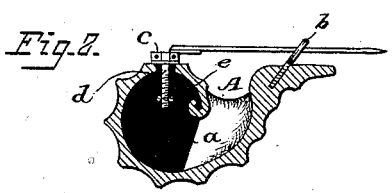
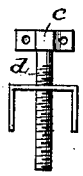
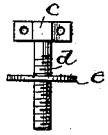
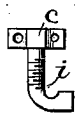
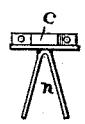
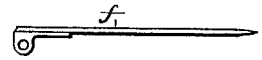
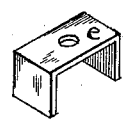
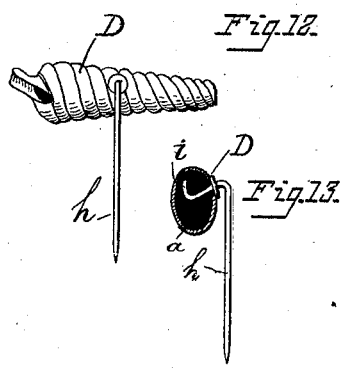

UNITED STATES PATENT OFFICE.

CHRISTOPHER MOEGLING, OF WASHINGTON, DISTRICT OF COLUMBIA.

MANUFACTURE OF SHELL JEWELRY.

SPECIFICATION forming part of Letters Patent No. 369,649, dated September 6, 1887.

Application filed July 12, 1887. Serial No. 244,070. (No model.)

*To all whom it may concern:*

Be it known that I, CHRISTOPHER MOEGLING, a citizen of the United States, residing at Washington, in the District of Columbia, have invented certain new and useful Improvements in the Manufacture of Shell Jewelry, of which the following is a specification, reference being had therein to the accompanying drawings.

My invention relates to the preparation of and adapting mollusk and other shells to use as jewelry and ornaments for the person; and it consists in properly mounting such shells and introducing therein, in solution, a composition which, hardening, adheres to and gives stability to the shell and secures the fastenings, as shown more at length hereinafter, reference being had to the drawings.

Figure 1 is a completed breastpin, showing the pin, clip, and catch. Fig. 2 is a cross-section of the same, showing the cement within and one mode of securing the pin-clip. Fig. 3 is a shell pendant for ear-rings or other purposes. Fig. 4 is a pin-clip and securing-step. Fig. 5 is the same, showing a securing-disk. Fig. 6 is a pin-clip having a bent and recessed shank. Fig. 7 is a pin-clip having a spring-shank. Fig. 8 is a pin for breastpin. Fig. 9 is a step for securing the pin-clip, having a female screw. Fig. 10 is a disk pin-clip step, showing a female screw. Fig. 11 is a shell adapted for use as a link in a chain or necklace, showing a loop at each end. Fig. 12 is a shell adapted for use as a scarf or shawl pin, showing the adjustment of the pin. Fig. 13 is a cross-section of the same, showing the cement on the inside and the mode of securing the pin.

Similar letters of reference indicate corresponding parts.

A is a mollusk-shell charged with cement $a$, having a pin-clip, $c$, carrying the ordinary fastening-pin, $f$, secured thereto by being screwed into a step, $e$, embedded in the supporting cement or composition $a$, as seen in Fig. 2. This shell is adapted for use as a breastpin.

B is another form of shell charged with cement or composition, and provided with a ring, $g$, secured in the end and adapted for use as a pendant to an ear-ring, or other similar use.

C is another mollusk-shell charged with cement and having a ring, $k$ $k$, secured in each end, and adapted for use as a link for a chain or necklace.

D is another mollusk-shell charged with cement $a$, having a pin, $h$, with a bent recessed shank, $i$, embedded in the cement, as shown in Fig. 13, and adapted for use as a scarf or shawl pin.

After removing the mollusk I carefully drill suitable and necessary holes for the mountings in the shell, insert the proper shank, $i$, $n$, or $d$, with its appropriate step $e$, and then introduce into the shell, in solution, a composition of plaster-of-paris and alum, or other suitable material that will readily harden and fill the interior, adhere to and strengthen the walls, give durability to the shell, and stability to the fastening.

It will be observed that the fastenings depend more for their security upon the material introduced into it than they do upon the fragile shell itself, for which reason I have adopted various forms of shank to the pin-clip.

Having now fully described my invention, what I esteem as new, and desire to secure by Letters Patent, is—

1. The method of adapting mollusk-shells for use in jewelry, which consists in puncturing the shell and inserting a cement or composition which sets and, becoming hard, secures the mounting employed and also strengthens and gives stability to the shell, substantially as specified.

2. As a new article of jewelry, a mollusk-shell charged with cement or a solidifying composition and provided with pins or other suitable fastening devices, substantially as described and shown.

In testimony whereof I have affixed my signature in presence of two witnesses.

CHRISTOPHER MOEGLING.

Witnesses:
CHARLES WALTER,
ANNIE G. SHOTWELL.